UNITED STATES PATENT OFFICE.

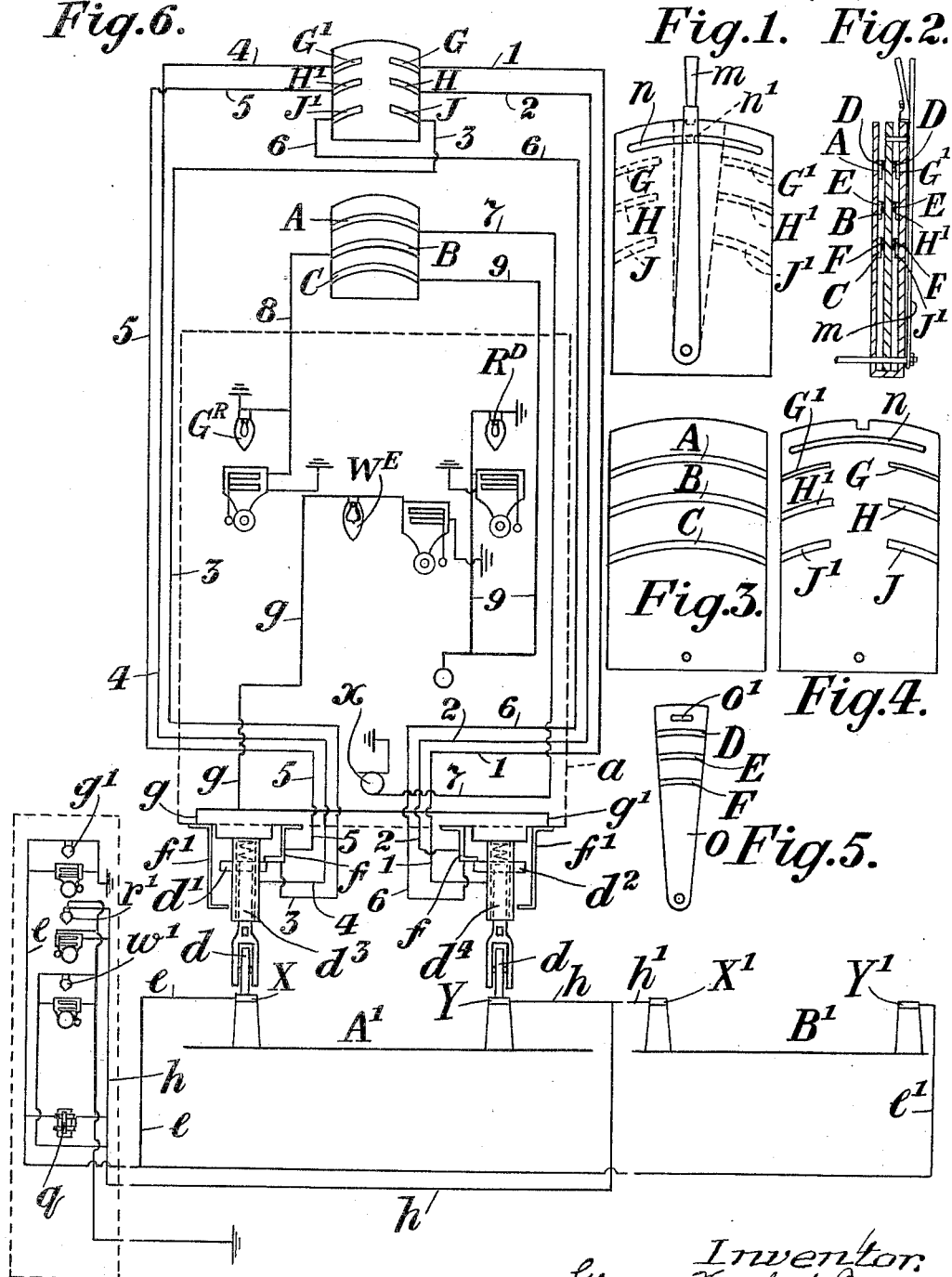

GEORGE HERBERT BROWN, OF BELFAST, IRELAND; KATHLEEN MARGARET BROWN AND HERBERT BROWN EXECUTORS AND TRUSTEES OF SAID GEORGE HERBERT BROWN, DECEASED.

ELECTRICAL BLOCK-SIGNALING APPARATUS FOR RAILWAYS.

1,097,388. Specification of Letters Patent. Patented May 19, 1914.

Original application filed September 20, 1907, Serial No. 393,805. Divided and this application filed August 22, 1908. Serial No. 449,872.

*To all whom it may concern:*

Be it known that I, GEORGE HERBERT BROWN, a subject of the King of Great Britain, residing at 14 Dublin road, Belfast, Ireland, have invented certain new and useful Improved Electrical Block-Signaling Apparatus for Railways, of which the following is a specification.

This invention has reference to the improved electrical block signaling system for railways described in the specifications of my United States Patents Nos. 906,861 and 1,072,404, dated December 15, 1908 and September 2, 1913, respectively, and is a subdivision of my said United States Patent No. 1,072,404. In a system such as described in my said applications it may not in many instances be possible or convenient at the end of a railway journey to turn the engine on a turntable and the engine makes the return journey tender first, therefore it is necessary to make provision for such a contingency where my system of signaling is installed.

In my signaling system, when an engine is going ahead i. e. funnel first, the left hand signaling trolley is to the outside of the railroad track and it makes contact with the ramp rail for conveying current from the engine to the signal cabin, and the right hand trolley makes contact with the inner ramp rail which is used to convey current from the signal cabin to the engine. It will be readily seen that in the case of a double track road in which the lines are wired so that each is the converse of the other, i. e. in which the connections to the two outer ramp rails are identical as are the connections to the two inner ramp rails, if the engine is moved from, say, the down line to the up line after having been turned on a turntable the left hand signaling trolley still makes contact with the outer ramp rail or ramp rail for conveying current from the engine to the signal cabin and the right hand trolley with the inner ramp rail or ramp rail for conveying current from the signal cabin to the engine and the circuits remain unchanged, but if the engine is moved from the down line to the up line without turning it on a turntable and then travels on the up line tender first that which was the outer trolley becomes the inner trolley, and instead of making contact with the ramp rail for conveying current from the engine to the signal cabin it will now make contact with the ramp rail for passing current from the signal cabin to the engine. Similarly what was the inner trolley becomes the outer trolley and instead of making contact with the ramp rail for conveying the current from the signal cabin to the engine it will now make contact with the ramp rail for conveying current from the engine to the signal cabin. It will thus be seen that the transferring of an engine from one set of rails to the other without turning it, reverses the positions of the contact trolleys relative to the ramp rails with the consequent reversal of the circuits in the signal cabin, so that, if an engine entered a signaling area traveling tender first and without the pole changing device herein described being used to change the various circuits, in order to give the proper signals, on the engine and in the signal cabin, then the entire signaling system would be confused, but, if the pole changing device herein described is provided and used, then the mere pulling over of the ordinary reversing lever of the engine also actuates the pole-changing device and the various circuits are changed as hereinafter described, in such a manner that the system will then operate as though the engine were running ahead or in the normal way i. e. with the tender to the rear.

The object of the present invention is to provide special pole-changing mechanism fitted in conjunction with the usual engine reversing lever whereby the various contacts used under the system can be reversed so as to cause the proper lights to appear in the engine cab or guard's van and signal cabin or cabins should the engine be running tender first.

In order that my said invention may be clearly understood I have hereunto appended explanatory drawings, whereon:—

Figures 1, 2, 3, 4, and 5 show detail views of an engine reversing lever having means in connection therewith for reversing all the contacts so as to cause the proper lights to appear in the engine cab or guard's van and signal cabin should the engine be running tender first. Fig. 6 is a diagrammatic view of an engine on a double track road, indicating the parts of the reversing lever shown in Figs. 1 to 5 in electrical relation to the various lamps and signals on the engine cab or guard's van, and in the signal cabin.

The pole changing device illustrated in the drawings is fitted in connection with the ordinary engine reversing lever $m$. Situated behind the lever $m$ is a box or casing made in two fixed parts, the front part (see Fig. 4) being fitted with six contacts suitably insulated from each other, three of these contacts G, H, and J, being on the right hand and three G', H' and J' being on the left hand as shown in Fig. 4. Near the top of this front part there is a curved slot $n$ through which projects the stud or pin $n'$ in the lever $m$. The back part of the box or casing (see Fig. 3) which is similar in construction to the front part is suitably secured thereto by means of screws or the like both parts being suitably insulated from each other. Three contacts A, B, C, are fitted in the back part and suitably insulated. These contacts are so arranged that they are always in contact with the contacts D, E, F, of the movable lever switch O (see Fig. 5) fitted between the back part and the front part of the box or casing. The movable lever switch O is so arranged that, when in one extreme position, its contacts D, E, F, which are suitably insulated from each other, connect the contacts A, B, C with the contacts G, H, and J, respectively, and when in the other extreme position connect the contacts A, B, and C with the contacts G', H' and J', respectively while, when in mid-position, they contact only with the contacts A, B and C. The upper end of the lever switch O is made with a short slot O' through which the stud or pin $n'$ on the lever $m$ projects.

The various parts are shown in proper relation to each other in the sectional view at Fig. 2 while in order to make clear the electrical connections reference will be made to the diagrammatic view Fig. 6, which also shows the cabin and track connections.

The contact G, is connected, by means of wire 1, with the right hand trolley $d$, the contact H is connected, by means of wire 2, with the right hand upper contact $f$ while the contact J is connected by means of wire 3 with the left hand upper contact $f$. The contact G' is connected by means of wire 4 with the left hand trolley $d$, the contact H' is connected by means of wire 5 with the left hand upper contact $f$ while the contact J' is connected by means of wire 6 with the right hand upper contact $f$. The slot $n$ is made of sufficient length to allow of the maximum movement of the lever $m$ in either direction.

The contacts A, B, and C, fitted in the back part of the box or casing are so arranged that the contact A connects by means of the wire 7 with the dynamo $x$ fitted on the engine frame, the contact B, by means of the wire 8 with the green lamp $G^r$ and bell on the engine, while the contact C, by means of the wire 9 connects with the red lamp $R^d$ and bell on the engine.

With the various parts of the pole-charging device arranged in connection with the reversing lever arranged as above described it will be seen that, when the train is going ahead, that is traveling on the track A' and with the lever $m$ pushed from left to right, the stud or pin $n'$ in the lever will pull the lever switch O over so that it connects the contacts A, B, C with the contacts G', H', and J' respectively and connection will be made between the dynamo $x$ and the left hand trolley $d$ through wire 7 and contact A, contact D, the contact G' and wire 4 and when the engine is over the ramp rails and the left hand trolley $d$ on the ramp rail X the upper stud $d'$ of said trolley $d$ will be brought into contact with the left contact $f$ and complete a circuit, through the trolley stud $d'$ and contact $f$, wire 5, contact H', contact piece E, contact B, wire 8, through green lamp $G^r$ and bell on engine, and through frame of engine to earth, thereby notifying the engine driver that the train is in a signaling area. At the same time a circuit will be completed from the dynamo $x$ through the left hand trolley $d$, as aforesaid, ramp rail X, wire $e$ and green lamp $g'$ and bell in signal cabin to earth, thereby notifying the signalman that a train is in the signaling area controlled from his cabin. If the way is blocked a circuit will be made between dynamo $x$ and red lamp, bell, and whistle in the following manner: from dynamo $x$ through wire 7, contact A, contact piece D, contact G', wire 4, left hand trolley $d$, ramp rail X to signal cabin where the danger signal is made by connecting the wires $e$ and $h$ by means of switch $q$ and from the signal cabin by the wire $h$ current is led to the right hand trolley $d$ (on ramp rail Y) then by trolley stud $d^2$, stud $f$, wire 6, contact J', contact piece F, contact C, wire 9, and red lamp $R^d$, etc., to frame of engine and to earth; also, a current will flow through switch $q$ along wire $h$ to red lamp $r'$ and bell in signal cabin and from thence to earth and as already described, contact will also be made through the upper left hand contact $f$, by wire 5, leading to contact H', contact pieces E, contact B, and wire 8 to the green lamp $G^r$ and bell on the engine.

Should the engine be moved from the track A' to the track B' and make the return journey on that track without having been turned on a turntable, the lever handle $m$ is moved from right to left, so that the stud $n'$ in the handle will traverse the slot $n$ and cause the lever switch O to move also and connect the contacts A, B, C with the contacts G, H, and J respectively through its contact pieces D, E, F. In this way the dynamo $x$ and the right hand trolley $d$ will be connected through the wire 7, contact A, contact pieces D, contact G, and wire 1 and if the engine is over the ramp rails with the right hand trolley $d$ on the ramp rail Y′ (the trolley stud $d^2$ making contact with the contact $f$) a circuit will be completed from dynamo $x$ to the green lamp G$^r$ and bell through wire 7, contact A, contact piece D, contact G, wire 1, trolley $d$, and trolley stud $d^2$, contact $f$, wire 2, contact H, contact E, contact B, wire 8, green lamp G$^r$ and bell, to frame of engine and to earth, thereby notifying the engine driver that the train is in a signaling area. At the same time a circuit will be completed from the dynamo $x$ through the right hand trolley $d$, as aforesaid, ramp rail Y′, wires $e'$ and $e$ and green lamp $g'$ and bell in signal cabin to earth, thereby notifying the signalman that a train is in the signaling area controlled from his cabin. If the line is blocked a circuit is formed between red lamp R$^d$ and dynamo as follows:—dynamo $x$, wire 7, contact A, contact piece D, contact G, wire 1, right hand trolley $d$, ramp rail Y′ and signal box to ramp rail X′ through wire $e'$, wire $e$, switch $q$ and wire $h$, left hand trolley $d$, trolley stud $d'$, contact $f$, wire 3, contact J, contact pieces F, contact C, wire 9, bell and lamp, etc., to frame of engine and so to earth, and a circuit is also completed through the red lamp $r'$ and bell in signal cabin as aforesaid. The green lamp G$^r$ and bell and the right hand upper contact $f$ will be connected through the contact B, the contact pieces E, contact H and wire 2 while the red lamp R$^d$ and left hand upper contact $f$ will be connected through the wire 9, contact C, contacts F, contact J and wire 3.

It will be seen that by reversing the contacts in the manner described the current from the engine is always supplied to the signal cabin through the wire $e$ when an engine is on the ramp rails whether it is traveling funnel or tender first and this is absolutely necessary to insure that the proper lights will be lighted and the proper signals given in the signal cabin. If no reversing arrangement such as described is used then on reversing the engine the current from the dynamo $x$ would be supplied to rail X′ and from rail X′ it would pass to the signal cabin by way of wire $h$ and thereby confuse the whole system.

When the engine is between the signaling areas and the trolleys out of contact with the signaling rails they drop down and their contact studs $d'$ and $d^2$ fall with them and make contacts with the contacts $f'$. In this position of the trolleys and their contact studs either of two circuits is completed depending on the position of the switch lever O. If the lever $m$ is pulled over so that the switch O connects the contacts A, B, C with the contacts G′, H′ and J′ respectively a circuit is completed from dynamo $x$ by wire 7, contact A, lever switch O, contact G′, wire 4, trolley standard $d^3$, contact stud $d'$, left hand contact $f'$, wire $g$, through white lamp W$^e$ and to earth by the engine framework; but, if the lever $m$ is pulled over so that it connects the contacts A, B, C with the contacts G, H, and J respectively then a circuit is completed from dynamo $x$ by wire 7, contact A, lever switch O, contact G, wire 1, trolley standard $d^4$, contact stud $d^2$, right hand contact $f'$, wire $g'$, wire $g$, through white lamp W$^e$ and to earth by the engine framework. Both of these circuits will maintain the white lamp W$^e$ lighted between the signaling areas and the train officials are, by this means, made aware of the proper working or otherwise of the source of supply of electricity, for so long as the lamp remains lighted, they know that the necessary supply of electricity is available.

Having now fully described my invention what I claim and desire to secure by Letters Patent is:—

1. In an electrical block signaling system for railways, such as described, the combination with a source of electricity on the engine, of two partial signaling circuits on the engine, a partial signaling circuit on the signaling area of the track, a signal on the track included in the partial circuit thereof, a contact included in each partial engine circuit, and a third contact common to both circuits and in permanent connection with the source of electricity on the engine, a switch lever in permanent slidable connection with the third contact and operable by the usual engine reversing lever to connect the contact of one of the partial engine circuits with the third contact when the engine is traveling funnel first and to connect the contact of the other partial engine circuit with the third contact when the engine is traveling tender first and, when the engine enters the signaling area, means whereby the partial engine circuit, in which the aforesaid switch is at the time included, is electrically connected with the partial track circuit to form a complete signaling circuit therewith and display the signal on the track.

2. In an electrical block signaling system for railways, such as described, the combination with a source of electricity on the engine, of three partial signaling circuits on the engine, a pair of contacts included in each of two of the partial engine circuits, one contact of each pair being in permanent electrical connection with the source of electricity on the engine, a signal in the engine cab included in the third partial engine circuit, three partial signaling circuits on the signaling area of the track, a signal on the track included in one of the partial circuits thereof, a second signal on the track included in a second partial circuit thereof, a switch on the track included in both the second and third partial circuits thereof, a switch on the engine operable by the usual engine reversing lever to bridge the contacts of one of the partial engine circuits when the engine is traveling funnel first and to bridge the contacts of another partial engine circuit when the engine is traveling tender first and, when the engine enters a signaling area, means whereby the partial engine circuit, in which the engine switch is at the time included, is electrically connected with a partial track circuit to form a complete signaling circuit therewith and display a signal on the track and means whereby when the switch on the track is closed the third partial circuit on the track is electrically connected with the third partial engine circuit to form a complete signaling circuit therewith and display a signal in the engine cab and whereby the second partial track circuit is completed and a second signal on the track is displayed.

3. In an electrical block signaling system for railways, such as described, the combination with a source of electricity on the engine, of an electric signaling-circuit on the engine, a signal in the engine cab included in said circuit, two partial signaling circuits on the engine, a partial signaling circuit in the signal cabin of the signaling area of the track, a signal in the cabin included in the partial circuit thereof, a pair of contacts included in each partial engine circuit, one contact of each pair being in permanent connection with the source of electricity on the engine, a switch operable by the usual engine reversing lever to bridge the contacts of one of the partial engine circuits when the engine is traveling funnel first and to bridge the contacts of the other partial engine circuit when the engine is traveling tender first and means whereby, when the engine enters the signaling area, the engine circuit is completed and the signal in said circuit displayed and whereby the partial engine circuit, in which the aforesaid switch is at the time included, is electrically connected with the partial signal cabin circuit to form a complete signaling circuit therewith and display the signal in the cabin.

4. In an electrical block signaling system for railways, such as described, the combination with a source of electricity on the engine, of two electric signaling circuits on the engine, two signals on the engine, one included in each of said signaling circuits, two partial signal circuits on the engine, a partial signaling circuit on the track, a signal on the track included in the partial circuit thereof, a pair of contacts included in each partial engine circuit, one contact of each pair being in permanent connection with the source of electricity on the engine, a switch operable by the usual engine reversing lever to bridge the contacts of one of the partial engine circuits when the engine is traveling funnel first and to bridge the contacts of the other partial engine circuit when the engine is traveling tender first, means whereby, when the engine is off a signaling area, a signaling circuit on the engine is completed and the signal therein displayed and means whereby, when the engine enters a signaling area, said last mentioned signaling circuit on the engine is broken and the signal therein rendered inoperative, whereby the other signaling circuit on the engine is completed and the signal therein displayed and whereby the partial engine circuit, in which the aforesaid switch is at the time included, is electrically connected with the partial track circuit to form a complete signaling circuit therewith and display the signal on the track.

5. In an electrical block signaling system for railways such as described, the combination, with a source of electricity on the engine, of an electric signaling circuit on the engine, a signal on the engine included in said circuit, two partial signaling circuits on the engine, a partial signaling circuit on the track, a signal on the track included in the partial circuit thereof, two contacts, one included in each partial engine circuit, a third contact common to both circuits and in permanent connection with the source of electricity on the engine, a switch lever in permanent slidable connection with the third contact and operable by the usual engine reversing lever to connect the contact of one of the partial engine circuits with the third contact when the engine is traveling funnel first and to connect the contact of the other partial engine circuit with the third contact when the engine is traveling tender first and means whereby, when the engine enters a signaling area, the engine circuit is completed and the signal therein displayed and whereby the partial engine circuit, in which the aforesaid switch is at the time included, is electrically connected with the partial track circuit to form a complete signaling circuit therewith and display the signal on the track.

6. In an electrical block signaling system for a double track railway, such as described, the combination, with a source of electricity on the engine, of ramp rails on each track, trolleys on the engine adapted to contact with said ramp rails, a swith contact on the engine, means connecting said contact with the source of electricity, second and third switch contacts on the engine, means connecting said second and third contacts with the aforesaid trolleys, means, operable by the engine reversing lever, whereby the first and second switch contacts are connected when the engine is traveling funnel first and the first and third contacts are connected when the engine is traveling tender first, a partial track circuit connected with a ramp rail of each track and a signal in said partial track circuit.

7. In an electrical block signaling system for a double track railway, such as described, the combination, with a source of electricity on the engine, of ramp rails on each track, trolleys on the engine adapted to contact with said ramp rails, a signal on the engine, a signaling circuit on the engine including said source of eletricity and signal, means whereby when the engine is off the ramp rails said circuit is completed and the signal therein displayed and when the engine is on the ramp rails said circuit is broken and the signal rendered inoperative, a switch contact on the engine, means connecting said contact with the source of electricity, second and third switch contacts on the engine, means connecting said second and third contacts with the aforesaid trolleys, means, operable by the engine reversing lever, whereby the first and second switch contacts are connected when the engine is traveling funel first and the first and third contacts are connected when the engine is traveling funnel first and the first and third connected with a ramp rail of each track and a signal in said partial track circuit.

8. In an electrical block signaling system for a double track railway, such as described, the combination, with a source of electricity on the engine, of ramp rails on each track, trolleys on the engine adapted to contact with said ramp rails, a signal on the engine, a signaling circuit on the engine including said source of electricity and signal, a second signal on the engine, a second signaling circuit on the engine including the source of power and said second signal, means whereby when the engine is off the ramp rails said first engine circuit is completed and the signal therein displayed and whereby when the engine moves over ramp rails the second engine circuit is completed and the signal therein displayed while the first engine circuit is broken, a switch contact on the engine, means connecting said contact with the source of electricity, second and third switch contacts on the engine, means connecting said second and third contacts with the aforesaid trolleys, means, operable by the engine reversing lever, whereby the first and second switch contacts are connected when the engine is traveling funnel first and the first and third contacts are connected when the engine is traveling tender first, a partial track circuit connected with a ramp rail of each track and a signal in said partial track circuit.

9. In an electrical block signaling system for a double track railway, such as described, the combination, with a source of electricity on the engine, of ramp rails on each track, trolleys on the engine adapted to contact with said ramp rails, a switch contact on the engine, means connecting said contact with the source of electricity, second and third switch contacts on the engine, a switch lever operable by the engine reversing gear to connect the first and second switch contacts when the engine is traveling funnel first and the first and third contacts when the engine is traveling tender first, a partial track circuit connected with a ramp rail of each track and a signal in said partial track circuit.

10. In an electrical block signaling system for a double track railway, such as described, the combination, with a source of electricity on the engine, of ramp rails on each track, trolleys on the engine adapted to contact with said ramp rails, a switch contact on the engine, means connecting said contact with the source of electricity, second and third switch contacts on the engine, means connecting said second and third contacts with the aforesaid trolleys, a signal on the engine, fourth and fifth contacts on the engine, means connecting said signal and fourth and fifth contacts, means whereby when the engine is off the ramp rails the fourth and fifth contacts are connected with the second and third contacts, respectively, means, operable by the engine reversing lever, whereby the first and second switch contacts are connected when the engine is traveling funnel first and the first and third contacts are connected when the engine is traveling tender first, a partial track circuit connected with a ramp rail of each track and a signal in said partial track circuit.

11. In an electrical block signaling system for a double track railway, such as described, the combination, with a source of electricity on the engine, of ramp rails on each track, trolleys on the engine adapted to contact with said ramp rails, a switch contact on the engine, means connecting said contact with the source of electricity, second and third switch contacts on the engine, means connecting said second and third contacts with the aforesaid trolleys, a signal on the engine, fourth and fifth contacts on the engine, means connecting said signal and fourth and fifth contacts, a contact on each trolley, means whereby when the engine is off the ramp rails the fourth and fifth contacts contact with the trolley contacts, means, operable by the engine reversing lever, whereby the first and second switch contacts are connected when the engine is traveling funnel first and the first and third contacts are connected when the engine is traveling tender first, a partial track circuit connected with a ramp rail of each track and a signal in said partial track circuit.

12. In an electrical signaling system for a double track railway, such as described, the combination, with a source of electricity on the engine, of ramp rails on each track, trolleys on the engine adapted to contact with said ramp rails, a signal on the engine, a signaling circuit on the engine including said source of electricity and signal, means whereby when the engine moves over the ramp rails said circuit is completed and the signal therein displayed, a switch contact on the engine, means connecting said contact with the source of electricity, second and third switch contacts on the engine, means connecting said second and third contacts with the aforesaid trolleys, means, operable by the engine reversing lever, whereby the first and second switch contacts are connected when the engine is traveling funnel first and the first and third contacts are connected when the engine is traveling tender first, a partial track circuit connected with a ramp rail of each track and a signal in said partial track circuit.

13. In an electrical block signaling system for a double track railway, such as described, the combination, with a source of electricity on the engine, of ramp rails on each track, trolleys on the engine adapted to contact with said ramp rails, a switch contact on the engine, means connecting said contact with the source of electricity, second and third switch contacts on the engine, means connecting said second and third contacts with the aforesaid trolleys, a signal on the engine, a fourth switch contact connected therewith, fifth and sixth switch contacts, seventh and eighth contacts connected with said fifth and sixth contacts, respectively, means whereby when the engine moves over the ramp rails the seventh and eighth contacts are connected with the second and third contacts, respectively, means, operable by the engine reversing lever, whereby the first and second and fourth and fifth switch contacts are connected when the engine is traveling funnel first and the first and third and fourth and sixth contacts are connected when the engine is traveling tender first, a partial track circuit connected with a ramp rail, of each track and a signal in said partial track circuit.

14. In an electrical block signaling system for a double track railway, such as described, the combination, with a source of electricity on the engine, of ramp rails on each track, trolleys on the engine adapted to contact with said ramp rails, a switch contact on the engine, means connecting said contact with the source of electricity, second and third switch contacts on the engine, means connecting said second and third contacts with the aforesaid trolleys, a signal on the engine, a fourth switch contact connected therewith, fifth and sixth switch contacts, seventh and eighth contacts connected with said fifth and sixth contacts, respectively, means whereby when the engine moves over the ramp rails the seventh and eighth contacts are connected with the third and second contacts, respectively, means, operable by the engine reversing lever, whereby the first and second and fourth and fifth switch contacts are connected when the engine is traveling funnel first and the first and third and fourth and sixth contacts are connected when the engine is traveling tender first, a partial track circuit connected with a ramp rail of each track, a signal in said partial track circuit, a second partial track circuit connected with other ramp rails of each track and a switch in said second partial track circuit.

In testimony whereof I affix my signature in presence of two witnesses.

GEORGE HERBERT BROWN.

Witnesses:
JOHN CURRIE,
FRANCIS FARRELL.